(12) United States Patent
Takenaka

(10) Patent No.: US 7,339,862 B2
(45) Date of Patent: Mar. 4, 2008

(54) OPTICAL DISC DRIVING SYSTEM AND METHOD FOR DETERMINING ROTATION SPEED OF OPTICAL DISC

(75) Inventor: Hiroyuki Takenaka, Osaka (JP)

(73) Assignee: Funai Electric Co., Ltd. (JP)

( * ) Notice: Subject to any disclaimer, the term of this patent is extended or adjusted under 35 U.S.C. 154(b) by 558 days.

(21) Appl. No.: 10/949,370

(22) Filed: Sep. 27, 2004

(65) Prior Publication Data

US 2005/0069300 A1 Mar. 31, 2005

(30) Foreign Application Priority Data

Sep. 29, 2003 (JP) ............... 2003-336848

(51) Int. Cl.
*G11B 15/46* (2006.01)
(52) U.S. Cl. .................. 369/47.41; 369/47.32; 369/47.44
(58) Field of Classification Search ............ 369/47.32, 369/47.38, 47.41, 47.44, 47.45
See application file for complete search history.

(56) References Cited

U.S. PATENT DOCUMENTS

| | | | | |
|---|---|---|---|---|
| 5,528,574 A * | 6/1996 | Takeuchi et al. | ............ | 369/47.4 |
| 5,684,703 A * | 11/1997 | Itoh et al. | ............ | 701/200 |
| 5,982,570 A | 11/1999 | Koizumi et al. | ............ | 360/69 |
| 6,018,506 A * | 1/2000 | Okabe et al. | ............ | 369/30.23 |
| 6,031,801 A * | 2/2000 | Ishikawa et al. | ......... | 369/47.24 |
| 6,151,182 A | 11/2000 | Koizumi et al. | ............ | 360/69 |
| 6,317,398 B1 * | 11/2001 | Shimada | ............ | 369/47.32 |
| 6,381,087 B1 | 4/2002 | Koizumi et al. | ............ | 360/69 |
| 6,476,994 B2 | 11/2002 | Koizumi et al. | ............ | 360/69 |
| 6,563,658 B2 | 5/2003 | Koizumi et al. | ............ | 360/69 |
| 6,775,212 B2 * | 8/2004 | Takahashi | ............ | 369/47.3 |
| 6,839,309 B1 * | 1/2005 | Yunoki et al. | ............ | 369/47.33 |
| 6,865,048 B2 | 3/2005 | Koizumi et al. | ............ | 360/69 |
| 7,000,134 B2 * | 2/2006 | Tsukihashi | ............ | 713/340 |
| 7,012,867 B2 * | 3/2006 | Kurobe et al. | ............ | 369/47.48 |
| 2005/0146806 A1 | 7/2005 | Koizumi et al. | ............ | 360/69 |

FOREIGN PATENT DOCUMENTS

| | | |
|---|---|---|
| JP | 58-26213 | 2/1983 |
| JP | 07-334950 | 12/1995 |
| JP | 1999-126422 | 5/1999 |
| JP | 2000-182309 | 6/2000 |
| JP | 2001-291309 | 10/2001 |
| JP | 2003-173536 | 6/2003 |

* cited by examiner

*Primary Examiner*—Thang V. Tran
(74) *Attorney, Agent, or Firm*—Bacon & Thomas, PLLC

(57) ABSTRACT

A novel optical disc driving system and method for determining the rotation speed of an optical disc are provided, which allow to determine the highest rotation speed optimal for reading out audio and video data in the optical disc in accordance with the environmental conditions in the vicinity of the optical disc driving unit, in particular the time and temperature. The rotation speed is determined by reading out the data recorded in the optical disc under the permissible operation conditions, which result from both actually measured parameters for environmental conditions and predetermined upper and lower limits of the rotation speed for a disc spindle motor for the respective ranges of parameters. The parameters for environmental conditions and the upper and lower limits of the rotation speed can be manually changed by user's instruction.

18 Claims, 6 Drawing Sheets

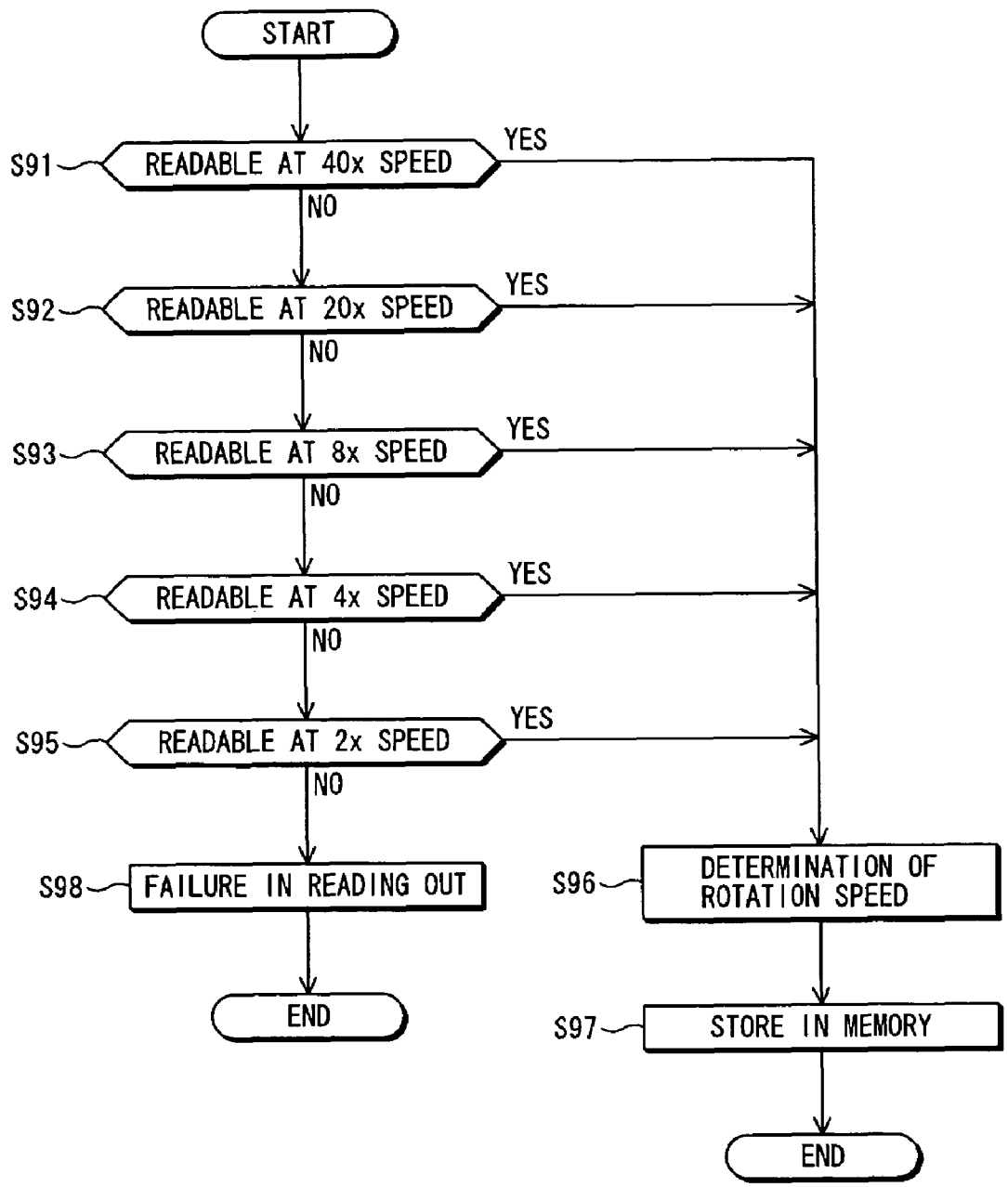

OPTICAL DISC DRIVING SYSTEM AND METHOD FOR DETERMINING ROTATION SPEED OF OPTICAL DISC

BACKGROUND OF THE INVENTION

1. Field of the Invention

The present invention relates to an optical disc driving system and a method for determining the rotation speed of an optical disc, which are capable of optimally determining the rotation speed of the optical disc in accordance with environmental conditions.

2. Description of the Related Art

At present, such an optical disc, as CD, DVD or the like, is widely used as a recording medium for audio data and/or video data, and the requirements on the high-speed reading of the data in the optical disc are steadily increased. In conjunction therewith, the rotation speed of a disc spindle motor used for rotating the optical disc in an optical disc playback system is also increased.

Such an optical disc playback system is equipped with an optical pickup for reading out data recorded in the optical disc, a disc spindle motor for rotating the optical disc, a memory for temporarily storing the data thus read out, input/output means for supplying the data stored in the memory from the optical disc playback system to an external appliance and for receiving the data from the external appliance, and a control unit for controlling active elements in the optical disc playback system.

Moreover, the optical disc playback system is conventionally designed such that the disc spindle motor can be rotated at one of six different rotation speeds, such as the normal or rated rotation speed, two times, four times, eight times, twenty times and forty times as large as the normal rotation speed (hereinafter, they are represented as 2× speed, 4× speed, 8× speed, 20× speed and 40× speed, respectively). In the optical disc playback system, data recorded in the optical disc are initially read out at the highest rotation speed of the disc spindle motor. When failed in reading out the data at the highest rotation speed, the data in the disc is read out at a further reduced rotation speed of the disc spindle motor.

When succeeded in reading out the data at the reduced rotation speed, the rotation speed in this case is regarded as the rotation speed of reading-out in the optical disc playback system. However, when again failed in reading out the data at the reduced rotation speed, the rotation speed for the disc spindle motor has to be further reduced. When the data cannot be read out at the normal rotation speed even after the sequence of such processes, the optical disc playback system recognizes the failure in reading out the data of the optical disc at the normal rotation speed, and then the control unit informs the failure in reading out the data to a user via a display. Then, the optical disc playback system finishes the reading out of the data (see, for example, Japanese Unexamined Patent Application Publication No. 2001-291309).

However, an increased rotation speed of the disc spindle motor in the conventional optical disc driving system causes to increase the power consumption as well as to increase the intensity of noise. In a quiet environment as at midnight or early in the morning, the noise is particularly sticking out. Generally, the noise is a high frequency sound emanating from rotary elements, which rotate at a high speed, and therefore it is offensive to the ear.

When, moreover, the optical disc is rotated at high speed for long period, mechanical elements, such as the disc spindle motor, rotary shafts, and bearings therefore, suffer heavy load. When the disc spindle motor is driven under a heavy load condition, a greater amount of heat is generated from the disc spindle motor. Accordingly, it is necessary to install a cooling apparatus, such as an air-cooling fan or the like in the vicinity thereof.

In the case where the optical disc is rotated at high speed, several troubles may occur due to the inclusion of micro particles, such as dust, trash or the others, into spaces between frictional mechanical elements, such as bearings or the like, and therefore a very high precision is required to mount rotary elements onto the positions.

SUMMARY OF THE INVENTION

Accordingly, it is an object of the present invention to provide an optical disc driving system, which is capable of optimally determining the rotation speed of an optical disc in accordance with environmental conditions around the optical disc driving unit in order to suppress the generation of noise and malfunction.

Furthermore, it is another object of the present invention to provide a method for determining the rotation speed of an optical disc, which method is capable of optimally determining the rotation speed of an optical disc in accordance with environmental conditions around the optical disc driving unit in order to suppress the generation of noise and malfunction.

In accordance with a first aspect of the present invention, the first object is attained by an optical disc driving system for reading out audio and/or video data recorded in an optical disc, the optical disc driving system comprising: an optical disc driving unit; and an external appliance, wherein the optical disc driving unit comprising: a disc spindle motor for rotating the optical disc at one of predetermined rotation speeds each having a discrete value; an optical pickup movable in the radial direction of the optical disc for reading out the data therefrom by detecting the light reflected from the optical disc which is irradiated by a laser light; a memory for temporally storing data read out by the optical pickup; an input/output section for inputting the data from the external appliance to the optical disc drive unit and for outputting the data from the optical disc driving unit to the external appliance; a control unit for controlling the disc spindle motor, the optical pickup and the memory; and a control input section for inputting control signals from the external appliance into the control unit, wherein the external appliance comprising: at least one detector for measuring at least one parameter as for environmental conditions in the vicinity of the optical disc driving unit; a storage unit for storing predetermined upper and lower limits of the rotation speed for the optical disc within the range of the at least one parameter in at least one table; and process means for determining permissible upper and lower limits of the rotation speed by comparing the measured parameter with that in the at least one table and for supplying the upper and lower limits thus determined to the control unit, whereby the control unit determines the rotation speed at which the data can be actually read out, after stepwise decreasing the rotation speed from the upper limit to the lower limit, based on the upper and lower limits of the rotation speed supplied from the external appliance, and then supplies the rotation speed thus determined to the memory.

In the first aspect of the present invention, the optical disc driving unit can be operated at the highest rotation speed under optimal conditions in accordance with the environmental conditions, and the optical disc driving system can be used as an optical disc playback apparatus.

In accordance with a second aspect of the present invention, the first object is attained by an optical disc driving system for reading out audio and/or video data recorded in an optical disc, the optical disc driving system comprising: an optical disc driving unit; and an external appliance, wherein the optical disc driving unit comprising: a disc spindle motor for rotating the optical disc at one of predetermined rotation speeds each having a discrete value; an optical pickup movable in the radial direction of the optical disc for recording the data therein by irradiating a laser light onto the optical disc and for reading out the data therefrom by detecting the light reflected from the optical disc which is irradiated by the laser light; a memory for temporally storing data recorded or read out by the optical pickup; an input/output section for inputting the data from the external appliance to the optical disc driving unit and for outputting the data from the optical disc driving unit to the external appliance; a control unit for controlling the disc spindle motor, the optical pickup and the memory; and a control input section for inputting control signals from the external appliance into the control unit, wherein the external appliance comprising: at least one detector for measuring at least one parameter as for environmental conditions in the vicinity of the optical disc driving unit; a storage unit for storing predetermined upper and lower limits of the rotation speed for the optical disc within the range of the at least one parameter in at least one table; and process means for determining permissible upper and lower limits of the rotation speed by comparing the measured parameter with that in the at least one table and for supplying the upper and lower limits thus determined to the control unit, whereby the control unit determines the rotation speed at which the data can be actually read out, after stepwise decreasing the rotation speed from the upper limit to the lower limit, based on the upper and lower limits of the rotation speed supplied from the external appliance, and then supplies the rotation speed thus determined to the memory.

In the second aspect of the present invention, the optical disc driving unit can be operated at the highest rotation speed under optimal conditions in accordance with the environmental conditions, and the optical disc driving system can be used as an optical disc playing back/recording apparatus, i.e., a DVD recorder.

In the first and second aspects of the present invention, it is preferable that the environmental condition is one of the time at which the optical disc driving unit is operated, the temperature in the vicinity thereof, the room temperature, the humidity and the dust density.

In the first and second aspects of the present invention, it is preferable that the external appliance further includes an input operation section by which either all or part of the predetermined ranges for environmental parameters and the predetermined upper and lower limits of the rotation speed stored in the storage unit can be manually changed.

In the first and second aspects of the present invention, it is preferable that the input operation section is used for setting the priority in the usage of both the table in which the predetermined upper and lower limits of the rotation speed are stored within the respective ranges for the parameters of environmental conditions and the table in which the manually specified upper and lower limits of the rotation speed are stored within the respective ranges for the parameters of environmental conditions, and wherein the upper and lower limits of the rotation speed in the highest priority are supplied to the control unit.

In the first and second aspects of the present invention, it is preferable that the predetermined rotation speeds each having a discrete value are the normal speed, 2× speed, 4× speed, 8× speed, 20× speed and 40× speed.

In the first and second aspects of the present invention, it is preferable that both the input/output section and the control input section are constituted in the form of a unified component by an electric connector.

In accordance with the specific feature of the present invention, the second object is attained by a method for determining the highest speed of rotation for an optical disc in accordance with at least one parameter for environmental conditions in reading out audio and/or video data in the optical disc by an optical disc driving system, the method comprising the following steps of: ST1) measuring at least one parameter for environmental conditions; ST2) comparing the at least one parameter thus measured with the corresponding parameter in a table of a storage unit, in which predetermined upper and lower limits of the rotation speed are stored for various ranges of parameters, thereby determining the upper and lower limits of the rotation speed in this case; ST3) rotating the optical disc at the rotation speed of the upper limit for reading out audio and/or video data recorded therein; ST4) determining the rotation speed as the highest rotation speed in this case, when succeeded in reading out the data; ST5) rotating the optical disc at the predetermined further slower rotation speed to read out the data, when failed in reading out at the above-mentioned rotation speed; and ST6) repeating either step ST4 or step ST5 in accordance with the result of reading out by stepwise decreasing the rotation speed, till the rotation speed arrives at the lower limit, thereby determining the highest rotation speed at which the data is readable.

In the specific feature of the present invention, the optical disc driving unit can be operated at the highest rotation speed under optimal conditions in accordance with the environmental conditions.

In the specific feature of the present invention, it is preferable that the parameter for the environmental conditions is one of the time in which the optical disc driving unit is used, the temperature in the vicinity thereof, the room temperature, the humidity and the dust density.

In the specific feature of the present invention, it is preferable that either all or part of the predetermined ranges for environmental parameters and the predetermined upper and lower limits of the rotation speed stored in the storage unit can be manually changed.

In the specific feature of the present invention, it is preferable that the usage of both a first table in which the predetermined upper and lower limits of the rotation speed for the predetermined parameter ranges for the environmental conditions are stored and a second table in which the manually determined upper and lower limits of the rotation speed for the manually determined parameter ranges for the environmental conditions are stored is carried out in the manually specified priority.

In the specific feature of the present invention, it is preferable that the rotation speeds each having a discrete value are the normal speed, 2× speed, 4× speed, 8× speed, 20× speed and 40× speed.

In the specific feature of the present invention, it is preferable that the highest rotation speed for reading out is determined just after the power supply is turned on, and thereafter the audio and/or video data recorded in the optical disc are read out at the rotation speed thus determined till the power supply is turned off.

Other objects, features and advantages of the present invention will become apparent from the following description of the preferred embodiments with reference to the accompanying drawings.

BRIEF DESCRIPTION OF THE DRAWINGS

FIG. 6 is a flow chart for illustrating a conventional procedure of determining the rotation speed for an optical disc.

DESCRIPTION OF PREFERRED EMBODIMENTS

Before describing the present invention, the structural arrangement and function of a conventional optical disc playback system will be described as a comparative example.

Figure 5:
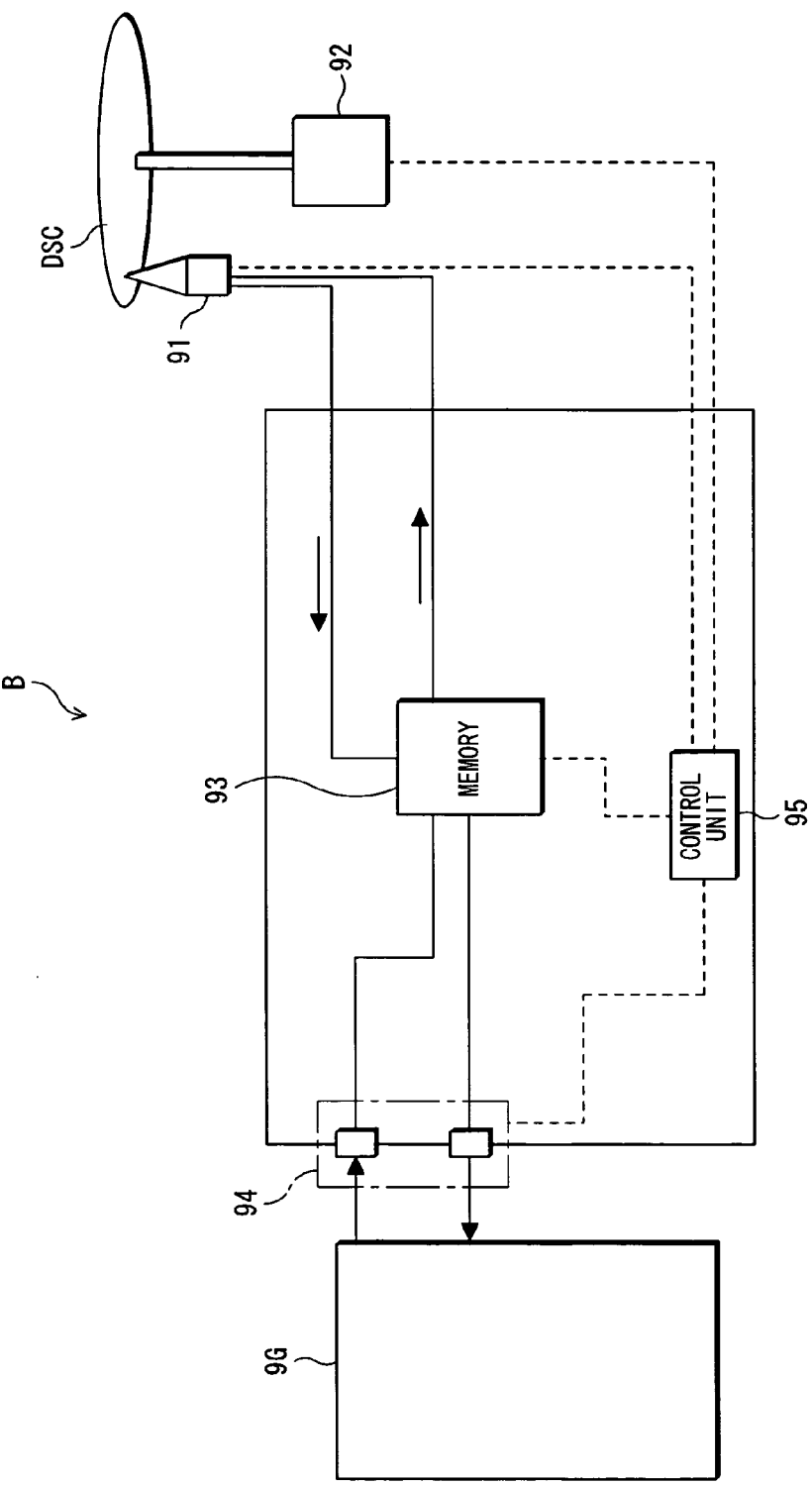
FIG. 5 is a schematic block diagram of a conventional optical disc driving system.

In an optical disc driving system shown in FIG. 5, an optical disc playback apparatus B is equipped with an optical pickup 91 for reading out audio and/or video data recorded in an optical disc Dsc, a disc spindle motor 92 for rotating the optical disc Dsc, a memory 93 for temporarily storing the data thus read out, input/output means 94 for supplying the data stored in the memory 93 to an external appliance 9G, and a control unit 95 for controlling active elements in the optical disc playback apparatus B.

The optical disc playback apparatus B is designed such that the disc spindle motor 92 can be rotated at one of six different rotation speeds, i.e., the normal speed, 2× speed, 4× speed, 8× speed, 20× speed and 40× speed. In the optical disc playback apparatus B, the data is read out from the optical disc Dsc at the highest rotation speed for the disc spindle motor 92. When failed in reading out at the highest rotation speed, the data is read out from the optical disc Dsc at a reduced rotation speed, as shown in FIG. 6.

When succeeded in reading out the data at the reduced rotation speed, the reduced rotation speed is set as the rotation speed of reading out in the optical disc playback apparatus B. When, however, failed in reading out the data, the rotation speed is further reduced. When failed in reading out the data at the normal rotation speed even after such a sequential reduction of the rotation speed, the optical disc driving system identifies the failure in reading out data, and the control unit 95 informs the failure in reading out to a user via a display (not shown). Then, the optical disc playback apparatus B finishes the reading out of the optical disc (see steps S91-S98 in the flow chart of FIG. 6), as described, for example, in Japanese Unexamined Patent Application Publication No. 2001-291309.

However, an increased rotation speed of the disc spindle motor 92 in such a conventional optical disc driving system causes to increase the power consumption of the system as well as to increase the intensity of noise. In a quiet environment as at midnight or early in the morning, the noise is particularly sticking out. Generally, the noise is a high frequency sound emanating from rotary elements, which rotate at high speed, and therefore it is offensive to the ear.

When, moreover, the optical disc Dsc is rotated at high speed for long period, mechanical elements, such as the disc spindle motor 92, rotary shafts, and bearings therefore, suffer heavy load. When the disc spindle motor 92 is driven under a heavy load condition, a greater amount of heat is generated from the disc spindle motor 92. Accordingly, it is necessary to install a cooling apparatus, such as an air-cooling fan or the like, in the vicinity thereof.

In the case when the optical disc Dsc is rotated at high speed, several troubles may occur due to the inclusion of micro particles, such as dust, trash or the others, into spaces between frictional mechanical elements, such as, bearings or the like, and therefore a very high precision is required to mount rotary elements onto these positions.

Figure 1:
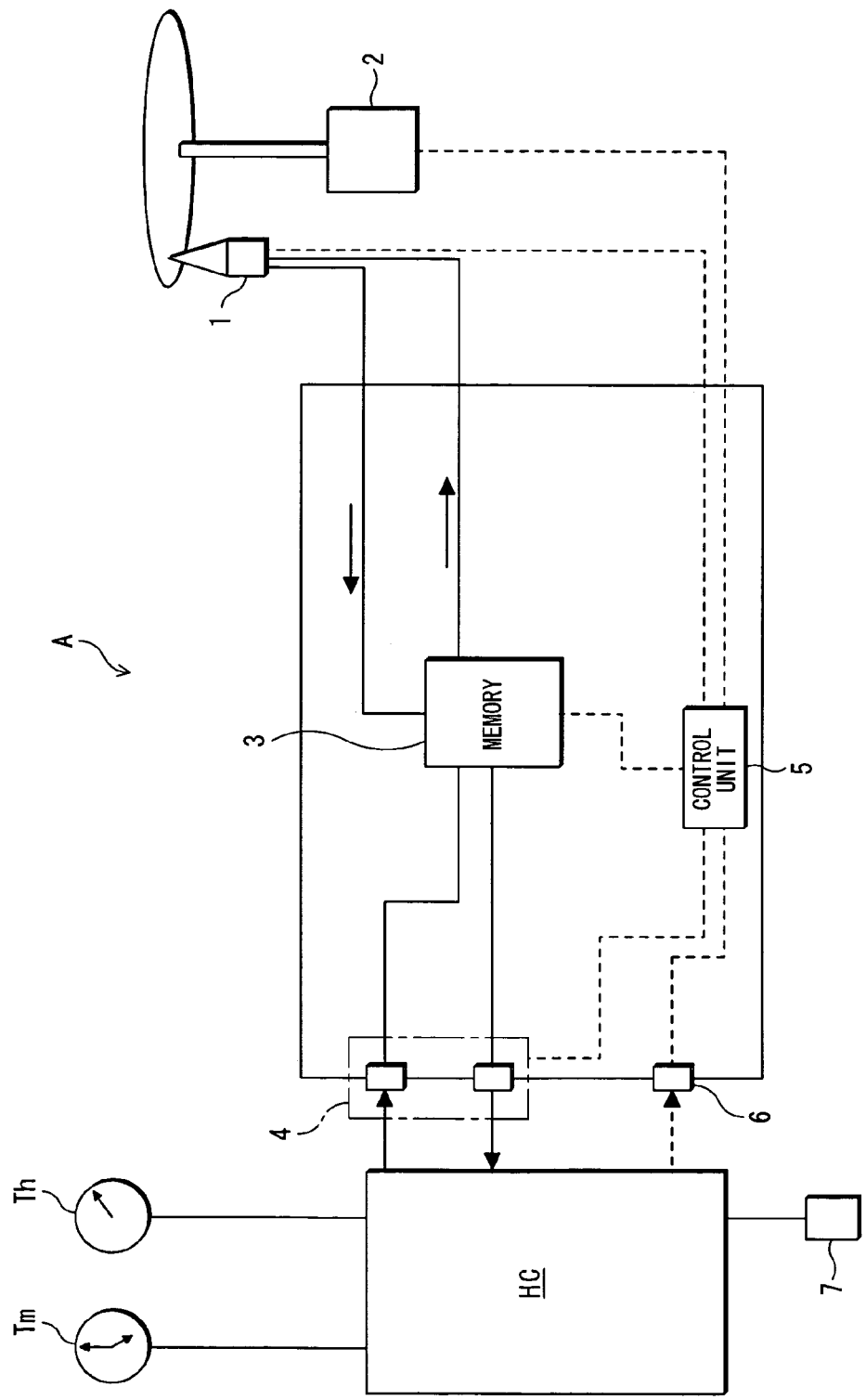
FIG. 1 is a schematic block diagram of an optical disc driving system according to the invention.

In the following, a preferred embodiment of the invention will be described. FIG. 1 is a schematic block diagram of an optical disc driving system according to the invention.

As shown in FIG. 1, the optical disc driving system consists of an optical disc driving unit A and an external appliance HC (e.g., a host computer). The optical disc driving unit A comprises an optical pickup 1 for reading out data recorded in an optical disc Dsc and/or for recording data in the optical disc Dsc, a disc spindle motor 2 for rotating the optical disc Dsc at a predetermined speed, a memory 3 for temporarily storing both data read out by the optical pickup 1 and the data to be recorded in the optical disc Dsc, an input/output section 4 for inputting the data from the external appliance HC to the optical disc driving unit A and for outputting the data from the optical disc driving unit A to the external appliance HC, a control unit 5 for controlling active elements in the optical disc driving unit A, and an information input section 6 for supplying control parameters determined by the external appliance HC on the basis of the environmental information to the control unit 5.

The optical pickup 1 is used for irradiating a laser light to the optical disc Dsc to record the data in the optical disc Dsc and/or for detecting the light reflected by the optical disc Dsc to read out the data recorded in the optical disc Dsc.

The disc spindle motor 2 is designed such that it can be rotated at one of the normal speed, 2× speed, 4× speed, 8× speed, 20× speed and 40× speed in accordance with the writing mode of writing the data into the optical disc Dsc by the optical pickup 1 or with the reading mode of reading out the data from the optical disc Dsc by the optical pickup 1, although these are not always limited thereto. In this case, the 2× speed means a rotation speed, which is twice as large as the normal speed of writing or the normal speed of reading out. The other speeds are also determined in a similar relationship.

The memory 3 serves to temporarily store the data supplied from the external appliance HC to be recorded in the optical disc Dsc as well as to temporarily store the data read out from the optical disc Dsc by the optical pickup 1. Furthermore, various setting parameters are also held in the memory 3.

The external appliance HC acquires environmental conditions as information for determining the conditions under which the disc spindle motor 2 is rotated. A thermometer Th for measuring the temperature inside the optical drive unit A or in the vicinity thereof and a timepiece Tm for indicating the time in the state of operation are allocated to the external appliance HC in order to acquire the environmental conditions. The external appliance HC supplies the lower and upper limits of the rotation speed determined on the basis of environmental information, such as the temperature, time or the like, to the control unit 5 via the information input section 6. Moreover, an input operation unit 7 for inputting instruction commands by a user is also allocated to the external appliance HC.

Figure 2A:
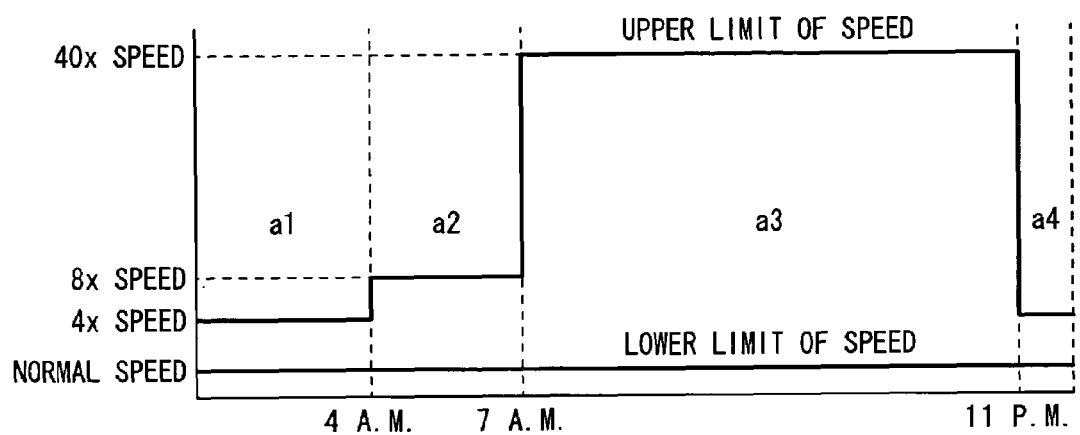
FIG. 2A illustrates the upper and lower limits of the rotation speed for an optical disc, which limits are selectively determined on the basis of the time information.
Figure 2B:
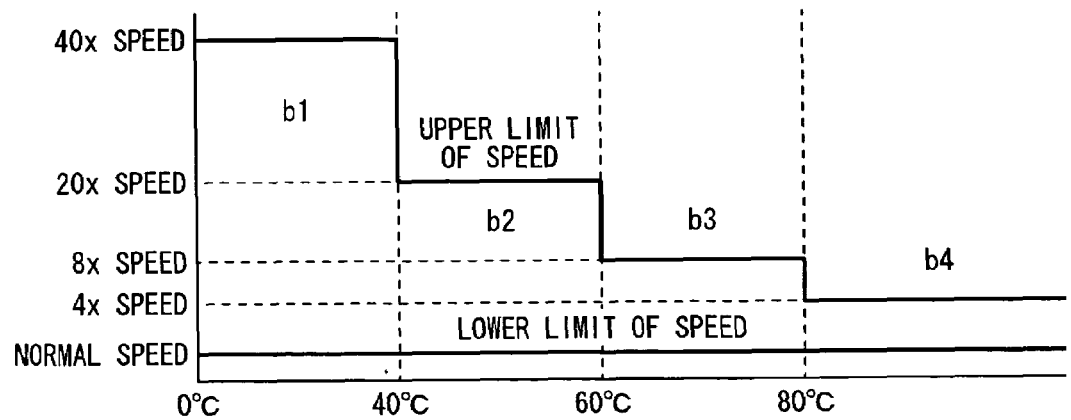
FIG. 2B illustrates the upper and lower limits of the rotation speed for an optical disc, which limits are selectively determined on the basis of the temperature information.

FIGS. 2A and 2B show the rotation speeds of an optical disc, which are desirable for the ranges of time and temperature, respectively.

The disc spindle motor 2 emanates noise having stronger intensity to outside with an increase in the rotation speed. At midnight, the disc spindle motor 2 has to be rotated in a soft operation mode (at a reduced speed) in order to avoid the generation of noise or to reduce the noise intensity as small as possible. The disc spindle motor 2 is rotated in a relatively busy operation mode (at a mid-speed) with a little more noise generation early in the morning, and further in a busy operation mode (at a high speed) in the daytime.

Accordingly, a first table for specifying the upper and lower limits of the rotation speed in each range of time is stored in a storage unit (not shown) of the external appliance HC. The environment is quiet in a time range of 11 p.m. to 4 a.m., and therefore the noise is particularly sticking out. As a result, the upper limit of the rotation speed is set at a relatively lower speed, i.e., 4× speed (a1 in FIG. 2A). In the time range of 4 a.m. to 7 a.m., noise is still sticking out, although the intensity thereof is relatively moderated. Accordingly, the upper limit of the rotation speed is set at 8× speed (a2 in FIG. 2A). In the other time range (7 a.m. to 11 p.m.), the upper limit of the rotation speed is set at 40× speed (a3 in FIG. 2A), so that the disc spindle motor 2 can be rotated at one of all the discrete rotation speeds between the upper limit and the normal speed. The external appliance HC determines the upper limit of the rotation speed from both the time range measured in the state of operation by the timepiece Tm and the usable range of the rotation speed in the first table, and supplies the upper limit of the rotation speed to the control unit 5.

Moreover, the disc spindle motor 2 and bearings therefore (not shown) generate a greater amount of heat with an increase in the rotation speed of the disc spindle motor 2. Such an optical disc driving unit A is mostly mounted in a precision machine, such as PC, audio or the like which includes semiconductor elements, and such semiconductor elements are sensitive to heat. Accordingly, there is a possibility that the heat emanated from the disc spindle motor 2 also deteriorates the semiconductor elements.

When the temperature information is supplied to the external appliance HC, which is connected to the optical disc driving unit A, the upper limit of the rotation speed is determined in accordance with the temperature to suppress such a heat generation. Accordingly, a second table for specifying the upper and lower limits of the rotation speed in the respective temperature ranges is stored in the storage unit (not shown) of the external appliance HC. In the second table, the upper limit of the rotation speed is specified to be 40× speed at a temperature less than 40° C. (b1 in FIG. 2B), 20× speed at a temperature from 40° C. to 60° C. (b2 in FIG. 2B), 8× speed at a temperature from 60° C. to 80° C. (b3 in FIG. 2B) and 4× speed at a temperature greater than 80° C. (b4 in FIG. 2B). Moreover, control parameters wherein the lower limit of the rotation speed is the normal speed at each temperature range are supplied from the external appliance HC to the control unit 5.

The determination of the rotation speed for the disc spindle motor 2 is carried out in the state in which the data in the optical disc Dsc is again read in after the power supply is turned on. For instance, the process of determination will be described, referring to the diagram in FIG. 2A. At 10.30 p.m., the disc spindle motor 2 should be rotated at 40× speed, and the disc spindle motor 2 is at 40× speed even past 11 p.m., so long as neither the optical disc Dsc inserted in the optical disc driving unit A is taken out therefrom nor the optical disc driving unit A is re-started after the power supply is turned off. A similar status may also result from the temperature in the environment. In the case when the specified range of time and/or temperature changes in the state of operation, the upper limit of the rotation speed can no longer be changed so as to meet a new range of time and/or temperature. If, however, the optical disc can be re-read after the reading is once interrupted, it is desirable to execute such a procedure.

In the above method, predetermined upper limits of time and temperature under control conditions are stored as two tables in the storage unit of the external appliance HC, and the upper and lower limits of the rotation speed for the disc spindle motor 2 are determined by comparing the actually measured time and temperature with those in the tables. In the present invention, however, the ranges of parameters for the environmental conditions (time and temperature) in the two tables and the upper limits thereof can also be changed by a user himself in accordance with his experience or his forecast. For this purpose, required numerical values and instructions are manually input to the external appliance HC from the input operation unit 7. The upper and lower limits of the rotation speed for the disc spindle motor 2 can be determined from user's instructions.

An adoption of the upper limit for the predetermined time range, the upper limit for the predetermined temperature range, the upper limit for the time range altered by user's instruction and the upper limit for the temperature altered by user's instruction can be determined by the priority which is specified by user's instruction. The external appliance HC supplies to the control unit 5 the upper and lower limits of the rotation speed, which limits are determined in accordance with the priority. After receiving the upper and lower limits, the control unit 5 determines the highest rotation speed for the disc spindle motor 2 to read out the data in the optical disc in accordance with a procedure, which will be described below, and supplies the rotation speed in this case to the memory 3.

Figure 3:
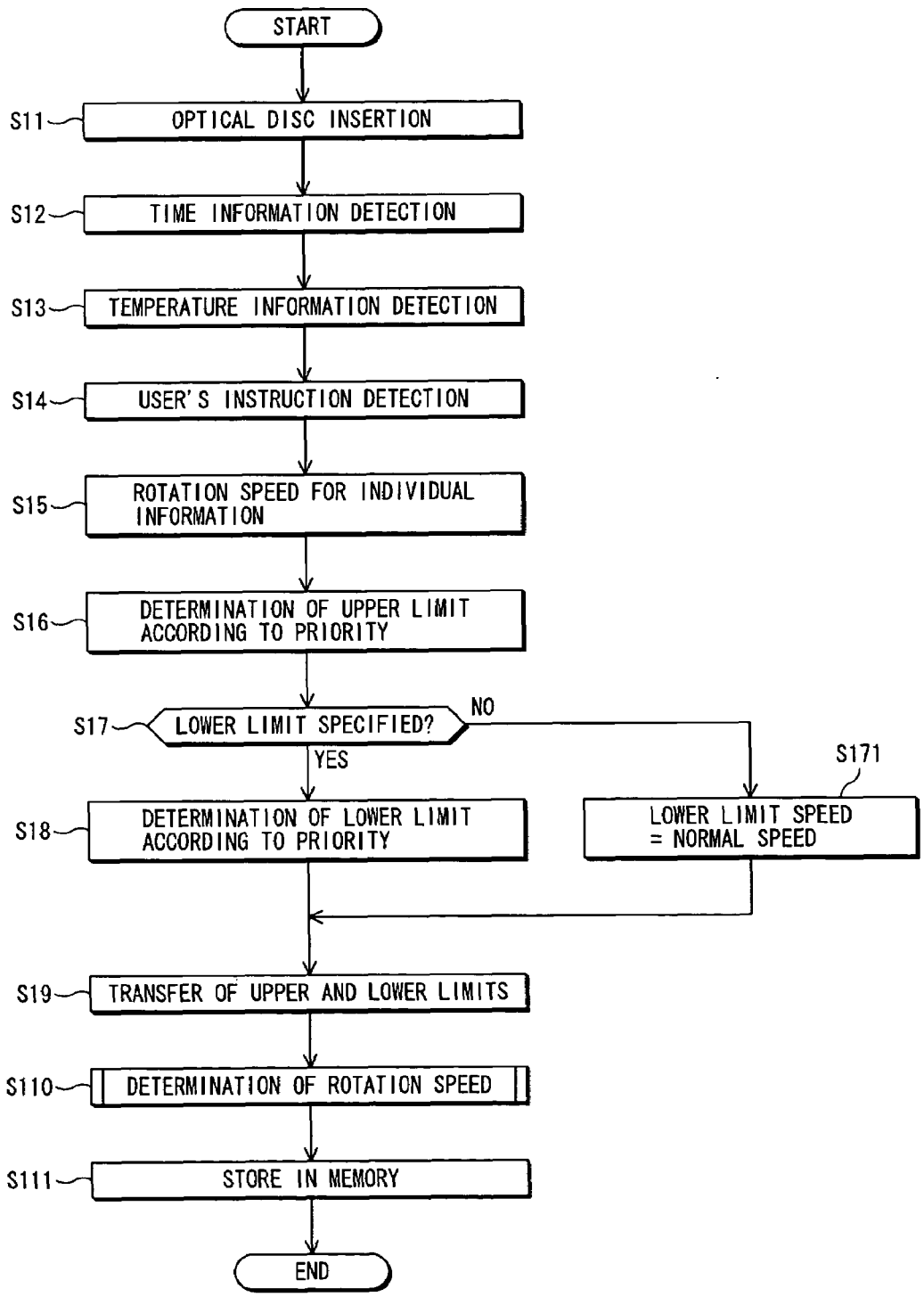
FIG. 3 is a flow chart for illustrating a procedure of determining the rotation speed for an optical disc according to the invention.

FIG. 3 is a flow chart showing the procedure of determining the rotation speed to read the data in the optical disc driving system according to the invention.

Firstly, the optical disc Dsc is inserted into the optical disc driving unit A (step S11). The time in the state of operation is determined by the timepiece Tm in the external appliance HC (step S12), and the temperature in the state of operation is sensed by the thermometer Th in the external appliance HC (step S13). Moreover, manual inputs by user's instruction are sensed (step S14). Predetermined upper and lower limits of the rotation speed in the respective ranges of time and temperature, and the upper and lower limits of the rotation speed in the respective ranges of time and temperature, which limits are determined by manually inputting user's instructions, are determined (step S15).

Among the predetermined upper limit of the rotation speed in the respective ranges of time and temperature, and the upper limit of the rotation speed in the respective ranges of time and temperature, which limits are determined by manually inputting user's instructions, those in the highest priority are selected (step S16). It is judged whether or not the lower limit of the rotation speed for the time information exists, whether or not the lower limit of the rotation speed for the temperature information exists, whether or not the lower limit of the rotation speed for time range specified by user's instruction exists, and whether or not the lower limit of the rotation speed for temperature range specified by user's instruction exists (step S17). When all of the lower limits are not specified (the case of NO in step S17), the lower limit of the rotation speed is set to be the normal speed (step S171). When at least one of the lower limits is specified (the case of YES in step S17), the lower limit of the rotation speed in the highest priority is selected (step S18).

The control parameters, i.e., the upper limit of the rotation speed determined in step S16 and the lower limit of the rotation speed determined either in step S171 or in step S18 are supplied to the control unit 5 in the optical disc driving unit A (step S19), and then the rotation speed for the disc spindle motor 2 suitable for operation is determined (step S110). The rotation speed for the disc spindle motor 2 determined in step S110 is stored in the memory 3 (step S111).

Figure 4:
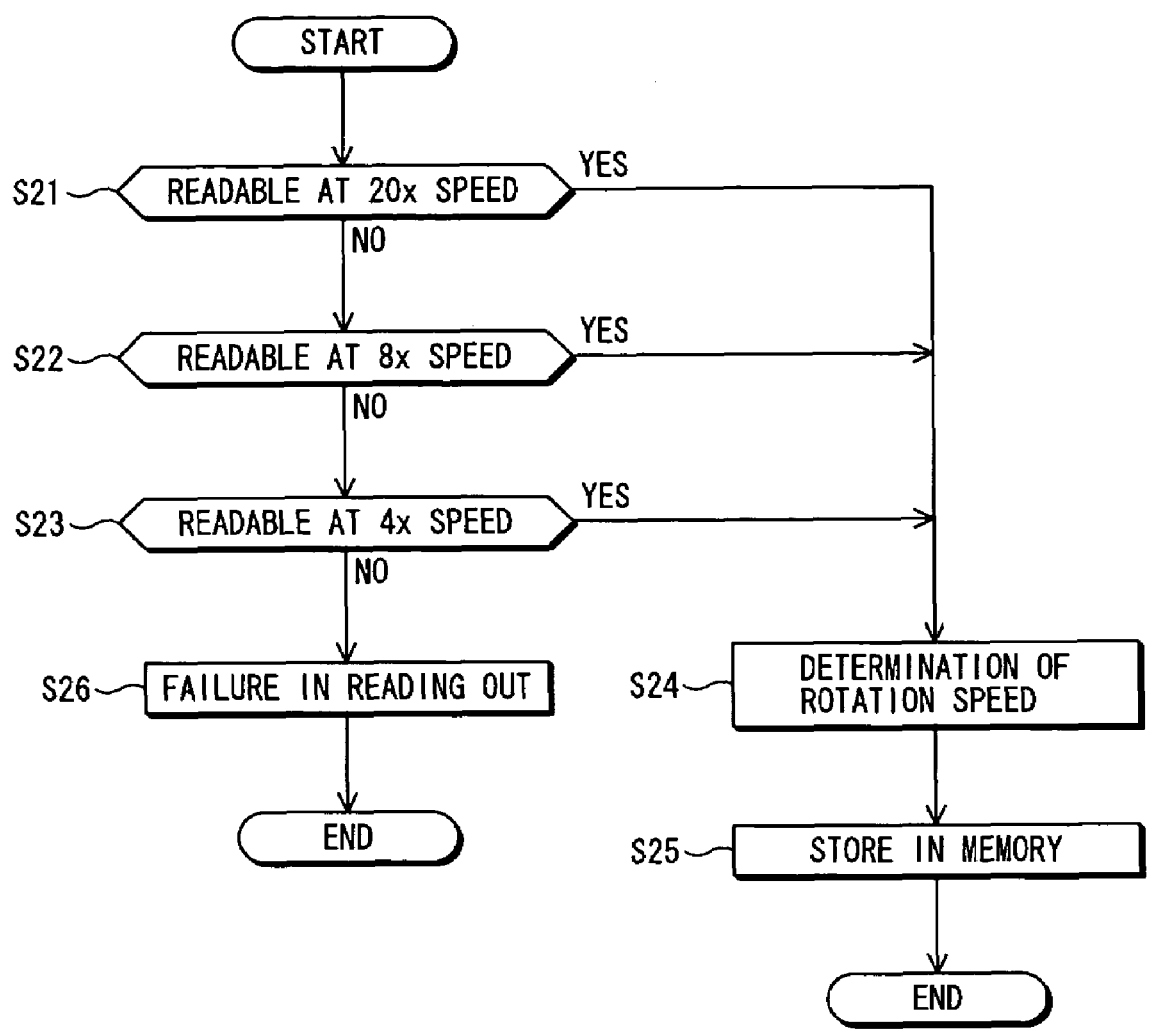
FIG. 4 is a flow chart for illustrating a detailed procedure of determining the rotation speed for an optical disc according to the invention.

FIG. 4 is a flow chart for describing the process of determining the rotation speed for the disc spindle motor 2 to read the data in the optical disc driving system according to the invention.

In the case when the upper and lower limits of the rotation speed for the disc spindle motor 2 are 20× and 4× speeds, respectively, these values are selected in the external appliance HC, and supplied to the control unit 5. Then, the control unit 5 tries to rotate the disc spindle motor 2 at 20× speed, and then judges whether or not the data recorded in the optical disc Dsc can be read out at the speed by the optical pickup 1 (step S21). In the case when the data recorded in the optical disc Dsc can be read out at 20× speed (case of YES in step 21), the rotation speed for the disc spindle motor 2 is determined as 20× speed (step S24), and the rotation speed thus determined is stored in memory 3 (step S25).

In the case when the data recorded in the optical disc Dsc cannot be read out at 20× speed (the case of NO in step S21), the rotation speed for the disc spindle motor 2 is changed from 20× speed to 8× speed, and then it is judged whether or not the data can be read out at the speed under this condition (step 22). In the case when the data recorded in the optical disc Dsc can be read out at the 8× speed (the case of YES in step S22), the rotation speed for the disc spindle motor 2 is determined as 8× speed (step S24), and then the rotation speed thus determined is stored in the memory 3 (step S25).

In the case when the data recorded in the optical disc Dsc cannot be read out at 8× speed (the case of NO in step S22), the rotation speed for the disc spindle motor 2 is changed from 8× speed to 4× speed, and then it is judged whether or not the data can be read out at the speed under this condition (step 23). In the case when the data recorded in the optical disc Dsc can be read out at 4× speed thus reduced (the case of YES in step S22), the rotation speed for the disc spindle motor 2 is determined as 4× speed (step S24), and then the rotation speed thus determined is stored in the memory 3 (step S25).

In the case when the data recorded in the optical disc Dsc cannot be read out at the further reduced rotation speed, i.e., at 4× speed (the case of NO in step S23), it is judged that the optical disc Dsc is unreadable, because the predetermined lower limit of the rotation speed for the disc spindle motor 2 has already been set to be 4× speed. This result is informed to the external appliance HC (step S26), and finally the process is finished.

In the above-described embodiment, a host computer HC is used as the external appliance, which is connected to the optical disc driving unit A, and is capable of supplying the upper and lower limits of the rotation speed for the disc spindle motor 2 to the control unit 5. However, the present invention is not limited to such a host computer, but rather it can be applied to any appliance, which allows to supply the upper and lower limits of the rotation speed to the control unit 5. In the above-described embodiment, moreover, the time and temperature are used as parameters for the environmental conditions. However, the present invention is not limited thereto, but the room temperature, humidity, density of dust, sound pressure or the others in the vicinity of the optical disc driving unit A can also be employed as such parameters for the environmental conditions.

In the above-described embodiment, the information input section 6 is used for connecting the external appliance (host computer) to the control unit 5. However, the information input section 6 can be integrated into the input/output section 4. Such an improvement of the input terminal makes it possible to use the method for determining the rotation speed of the disc spindle motor according to the invention in the existing optical disc driving unit without any substantial change in the external appliance.

While the present invention has been described with reference to the preferred embodiments, it is to be understood that the invention is not limited thereto. On the contrary, the invention is intended to cover various modifications and equivalent arrangements included within the spirit and scope of the appended claims.

What is claimed is:

1. An optical disc driving system for reading out audio and/or video data recorded in an optical disc, said optical disc driving system comprising:
   an optical disc driving unit; and
   an external appliance,
   wherein said optical disc driving unit comprising:
   a disc spindle motor for rotating said optical disc at one of predetermined rotation speeds each having a discrete value;
   an optical pickup movable in the radial direction of said optical disc for reading out said data therefrom by detecting the light reflected from said optical disc which is irradiated by laser light;
   a memory for temporally storing data read out by said optical pickup;
   an input/output section for inputting said data from said external appliance to said optical drive unit and for outputting said data from said optical disc driving unit to said external appliance;
   a control unit for controlling said disc spindle motor, said optical pickup and said memory; and
   a control input section for inputting control signals from said external appliance into said control unit,
   wherein said external appliance comprising:
   at least one detector for measuring at least one parameter as for environmental conditions in the vicinity of said optical disc driving unit;
   a storage unit for storing predetermined upper and lower limits of the rotation speed for said optical disc within the range of said at least one parameter in at least one table; and process means for determining permissible upper and lower limits of the rotation speed by comparing the measured parameter with that in said at least one table and for supplying the upper and lower limits thus determined to said control unit, whereby said control unit determines the rotation speed at which said data can be actually read out, after stepwise decreasing the rotation speed from said upper limit to said lower limit, based on said upper and lower limits of the rotation speed supplied from said external appliance, and then supplies the rotation speed thus determined to said memory.

2. An optical disc driving system according to claim 1, wherein said environmental condition is one of the time at which said optical disc driving unit is operated, the temperature in the vicinity thereof, the room temperature, the humidity and the dust density.

3. An optical disc driving system according to claim 2, wherein said external appliance further includes an input operation section by which either all or part of the predetermined ranges for environmental parameters and the predetermined upper and lower limits of the rotation speed stored in said storage unit can be manually changed.

4. An optical disc driving system according to claim 3, wherein said input operation section is used for setting the priority in the usage of both the table in which the predetermined upper and lower limits of the rotation speed are stored within the respective ranges for the parameters of environmental conditions and the table in which the manually specified upper and lower limits of the rotation speed are stored within the respective ranges for the parameters of environmental conditions, and wherein the upper and lower limits of the rotation speed in the highest priority are supplied to said control unit.

5. An optical disc driving system according to claim 1, wherein the predetermined rotation speeds each having a discrete value are the normal speed, 2× speed, 4× speed, 8× speed, 20× speed and 40× speed.

6. An optical disc driving system according to claim 1, wherein both said input/output section and said control input section are constituted in the form of an unified component by an electric connector.

7. An optical disc driving system for reading out audio and/or video data recorded in an optical disc, said optical disc driving system comprising:
an optical disc driving unit; and
an external appliance,
wherein said optical disc driving unit comprising:
a disc spindle motor for rotating said optical disc at one of predetermined rotation speeds each having a discrete value;
an optical pickup movable in the radial direction of said optical disc for recording said data therein by irradiating laser light onto said optical disc and for reading out said data therefrom by detecting the light reflected from said optical disc which is irradiated by laser light;
a memory for temporally storing data recorded or read out by said optical pickup;
an input/output section for inputting said data from said external appliance to said optical disc driving unit and for outputting said data from said optical disc driving unit to said external appliance;
a control unit for controlling said disc spindle motor, said optical pickup and said memory; and
a control input section for inputting control signals from said external appliance into said control unit,
wherein said external appliance comprising:

at least one detector for measuring at least one parameter as for the environmental conditions in the vicinity of said optical disc driving unit;

a storage unit for storing predetermined upper and lower limits of the rotation speed for said optical disc within the range of said at least one parameter in at least one table; and process means for determining permissible upper and lower limits of the rotation speed by comparing the measured parameter with that in said at least one table and for supplying the upper and lower limits thus determined to said control unit, whereby said control unit determines the rotation speed at which said data can be actually read out, after stepwise decreasing the rotation speed from said upper limit to said lower limit, based on said upper and lower limits of the rotation speed supplied from said external appliance, and then supplies the rotation speed thus determined to said memory.

8. An optical disc driving system according to claim 7, wherein said environmental condition is one of the time at which said optical disc driving unit is operated, the temperature in the vicinity thereof, the room temperature, the humidity and the dust density.

9. An optical disc driving system according to claim 8, wherein said external appliance further includes an input operation section by which either all or part of the predetermined ranges for environmental parameters and the predetermined upper and lower limits of the rotation speed stored in said storage unit can be manually changed.

10. An optical disc driving system according to claim 9, wherein said input operation section is used for setting the priority in the usage of both the table in which the predetermined upper and lower limits of the rotation speed are stored within the respective ranges for the parameters of environmental conditions and the table in which the manually specified upper and lower limits of the rotation speed are stored within the respective ranges for the parameters of environmental conditions, and wherein the upper and lower limits of the rotation speed in the highest priority are supplied to said control unit.

11. An optical disc driving system according to claim 7, wherein the predetermined rotation speeds each having a discrete value are the normal speed, 2× speed, 4× speed, 8× speed, 20× speed and 40× speed.

12. An optical disc driving system according to claim 7, wherein both said input/output section and said control input section are constituted in the form of an unified component by an electric connector.

13. A method for determining the highest speed of rotation for an optical disc in accordance with at least one parameter for environmental conditions in reading out audio and/or video data in the optical disc by an optical disc driving system, said method comprising the following steps of:

ST1) measuring at least one parameter for environmental conditions;

ST2) comparing said at least one parameter thus measured with the corresponding parameter in a table of a storage unit, in which predetermined upper and lower limits of the rotation speed are stored for various ranges of parameters, thereby determining the upper and lower limits of the rotation speed in this case;

ST3) rotating said optical disc at the rotation speed of the upper limit for reading out audio and/or video data recorded therein;

ST4) determining the rotation speed as the highest rotation speed in this case, when succeeded in reading out said data;

ST5) rotating said optical disc at the predetermined further slower rotation speed to read out said data, when failed in reading out at the above-mentioned rotation speed; and ST6) repeating either step ST4 or step ST5 in accordance with the result of reading out by stepwise decreasing the rotation speed till the rotation speed arrives at the lower limit, thereby determining the highest rotation speed at which said data is readable.

14. A method according to claim 13, wherein said parameter for environmental conditions is one of the time in which said optical disc driving unit is operated, the temperature in the vicinity thereof, the room temperature, the humidity or the dust density.

15. A method according to claim 14, wherein either all or part of the predetermined ranges for environmental parameters and the predetermined upper and lower limits of the rotation speed stored in said storage unit can be manually changed.

16. A method according to claim 15, wherein the usage of both a first table in which the predetermined upper and lower limits of the rotation speed for the predetermined parameter ranges for the environmental conditions are stored and a second table in which the manually determined upper and lower limits of the rotation speed for the manually determined parameter ranges for the environmental conditions are stored is carried out in the manually specified priority.

17. A method according to claim 13, wherein said rotation speeds each having a discrete value are the normal speed, 2× speed, 4× speed, 8× speed, 20× speed and 40× speed.

18. A method according to claim 13, wherein the highest rotation speed for reading out is determined just after the power supply is turned on, and thereafter said audio and/or video data recorded in said optical disc are read out at the rotation speed thus determined till the power supply is turned off.

* * * * *